United States Patent
Dutta

(10) Patent No.: US 12,488,120 B2
(45) Date of Patent: Dec. 2, 2025

(54) SYSTEM AND METHOD FOR SECURING DATA

(71) Applicant: Privaclave Inc., Mason, OH (US)

(72) Inventor: Siddhartha Dutta, Mason, OH (US)

(73) Assignee: Privaclave Inc., Mason, OH (US)

( * ) Notice: Subject to any disclaimer, the term of this patent is extended or adjusted under 35 U.S.C. 154(b) by 190 days.

(21) Appl. No.: 18/118,761

(22) Filed: Mar. 8, 2023

(65) Prior Publication Data
US 2023/0289454 A1    Sep. 14, 2023

Related U.S. Application Data

(60) Provisional application No. 63/317,650, filed on Mar. 8, 2022.

(51) Int. Cl.
G06F 21/60    (2013.01)
G06F 21/79    (2013.01)

(52) U.S. Cl.
CPC ............ G06F 21/602 (2013.01); G06F 21/79 (2013.01)

(58) Field of Classification Search
CPC ................................ G06F 21/602; G06F 21/79
See application file for complete search history.

(56) References Cited

U.S. PATENT DOCUMENTS

| | | | |
|---|---|---|---|
| 11,184,162 B1* | 11/2021 | Bhatkar | H04L 63/0435 |
| 2016/0112195 A1* | 4/2016 | Jochheim | H04L 9/14 |
| | | | 713/189 |
| 2019/0034645 A1* | 1/2019 | El-Moussa | G06F 21/62 |
| 2020/0044833 A1* | 2/2020 | Shpurov | G06F 21/6218 |
| 2021/0234673 A1* | 7/2021 | Kurian | H04L 9/3234 |
| 2023/0131060 A1* | 4/2023 | Ko | H04L 9/3213 |
| | | | 713/151 |

* cited by examiner

*Primary Examiner* — Sangseok Park
(74) *Attorney, Agent, or Firm* — Calfee Halter & Griswold LLP

(57) ABSTRACT

System and computer implemented method for enabling application level data protection while not requiring application code changes, thereby keeping data persistently protected while at rest, in transit, and when in use in certain cases. A computer implemented method for securing data comprises pre-defining a plurality of data protection policies for securing application level data stored in a plurality of software modules, deploying a first local parameter and a second local parameter in the application layer of a first software module and second software module respectively, configuring the first local parameter to selectively intercept and encrypt the application level data before the application level data leaves the application layer of the first software module and configuring a second local parameter to access the plurality of data protection policies and to selectively intercept and decrypt the encrypted application level data received by the second software module from the first software module.

14 Claims, 1 Drawing Sheet

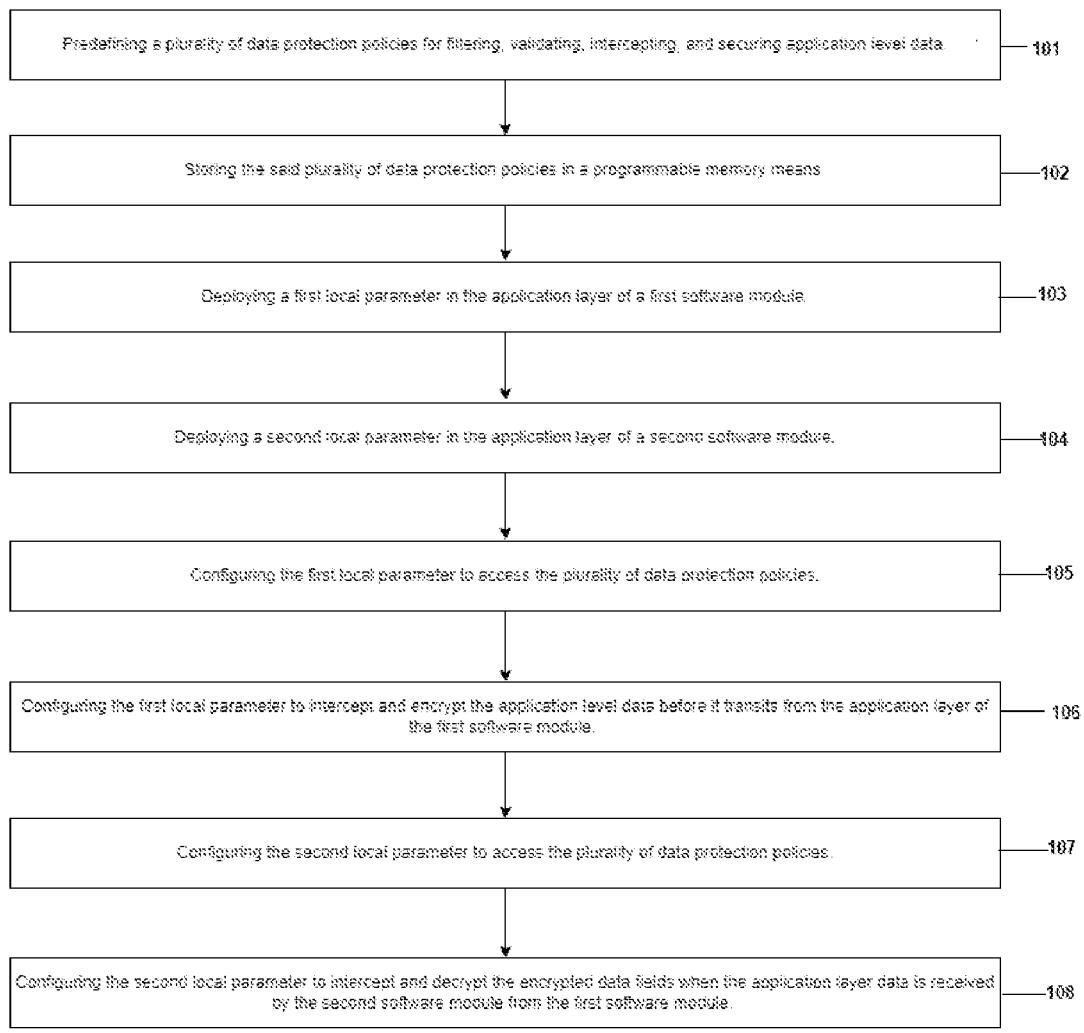

SYSTEM AND METHOD FOR SECURING DATA

CROSS-REFERENCE TO RELATED APPLICATION

The present application claims the benefit of the filing date of U.S. Provisional Application No. 63/317,650 filed on Mar. 8, 2022, which is incorporated herein by reference.

FIELD OF INVENTION

The present invention relates to a system and method for securing data transparently, and more particularly to a system and method which enables application level, data-centric protection, using any form of encryption, tokenization, masking, etc., while not requiring application code changes, thereby ensuring that data is persistently protected while at rest, in transit, and even when in use, based on the method of data protection chosen.

BACKGROUND OF INVENTION

Data protection solutions such as encryption, tokenization, masking, etc., are applied at various tiers of the enterprise application and data infrastructure stack, and each of them serve a certain purpose, with varying levels of ease or complexity, and effectiveness for protection from unauthorized view/access for malicious and non-malicious intent or activity. Each data protection model, i.e., a data protection solution and the tier it is applied to, enables protection from certain types of cyberattacks or threats, although each model has its own challenges around implementation along with associated risks and vulnerabilities.

Various data protection methods are known in the art. One such method is applying field level encryption, tokenization, masking, etc., at the application layer. This method provides the highest level of data protection and enables data protection while the data is at rest, in transit, and even in use in certain cases. This method however requires code level changes, rebuilding and redeployment of legacy applications, and requires months of development and testing efforts on a per business application basis, and huge investments when it comes to implementing and running an enterprise-wide data privacy and protection initiative. This method also requires knowledge of the data that is required to be protected and when those data is required to be protected and unprotected, and it also involves knowledge and understanding of data protection methodologies, data protection algorithms, key management and best practices around it, secrets management, authentication & authorization mechanisms, etc.

A typical and commonly used data protection method known in the art, is encryption at a database/dataset/file system level. This method enables simpler and quicker implementation at the data store level and does not require application level changes. This method also enables transparent decryption of data for users/applications/services that have access to the date stores. However, this method degrades performance of the system as it usually requires a full decryption of the database/dataset file before the data is readable to the authorized users or applications and does not provide protection of data once the data leaves the data store. Disk/storage level encryption also protects solely against media theft. Hence, these methodologies don't provide the necessary level of protection against modern cyber-attacks and threats.

The methods known in the art encrypt data at rest at the time when a database file is encrypted. However, once such data is in transit, that is once it leaves the database, the data is transparently decrypted, and is then processed, stored, transmitted etc., often relying on perimeter controls, infrastructure hardening, or network security controls such as SSL/TLS. Very often, cloud object storage buckets are misconfigured and thereby become publicly accessible and turning on server-side encryption may not protect the data from being exfiltrated in such cases. Hence, a data centric security strategy where data stays persistently protected while at rest, transit, and even in use, is highly desired. But as mentioned before, applying data-centric security at the application layer is invasive, complex and expensive.

There is therefore a dire need in the art for a data-centric security solution, that enables application layer based persistent data protection, without requiring any application code level changes, rigorous engagement or onboarding process for each application or business function, and the knowhow of cryptographic and non-cryptographic methodologies and key and secrets management, and this forms the primary objective of the present invention.

SUMMARY OF INVENTION

The present invention solves the problems in the art by providing a method and system for enabling application level data protection while not requiring any application code level changes.

In a preferred embodiment of the present invention, a computer implemented method for securing application level data is provided. The method comprises the steps of pre-defining a plurality of data protection policies for intercepting and securing application level data stored in a plurality of software modules, storing the said plurality of data protection policies in a programmable memory means, deploying a first local parameter in the application layer of a first software module, deploying a second local parameter in the application layer of a second software module, configuring the first local parameter to access the said plurality of data protection policies and to selectively intercept and encrypt the application level data stored in the first software module based on the said plurality of data protection policies, and configuring the second local parameter to access the said plurality of data protection policies and to selectively intercept and decrypt the encrypted application level data received by the second software module from the first software module, based on the said plurality of data protection policies. The present invention thereby selectively intercepts and encrypts application level data stored in the first software module, before it transits from the application layer of the first software module.

The present invention therefore transparently processes data in memory as if it was never protected in the first place, while the data stays protected while in transit or in use. In cases, where tokenization methods or format preserving encryption techniques are used, and the protected data retains the format and length of the original data, or in cases wherein a portion of the data is exposed to post data protection operation (say, leaving the first 6-8 digits or BIN of the credit card number, or the last 4 digits of the Social Security Number), there may not be a need for the second local parameter to even unprotect the data when being read, as the second software module maybe able to perform its functions on the protected data, hence allowing for persistent data security even during use and therefore the date is also not exposed in memory. Policies can also be defined for the second local parameter as to when to execute a decryption or detokenization operation when data is being made available to the second software module.

The present invention thereby alleviates the complexities in the art and enables data protection transparently at the application layer thus keeping data persistently protected while not requiring code level changes, code re-build and re-deployment, and hence ensures easy, transparent, streamlined, automated, and fast implementation of data centric protection at the application layer. The present is also cost effective and can be implemented with minimum effort from application teams.

The present invention is also flexible and extensible as it allows for baking in any open source, or commercial off the shelf solutions for data protection operations, key management, secrets management, etc. The policies can define the solutions that the agent need to integrate via APIs, and the agent can invoke those exposed APIs to either obtain credentials, or to obtain an encryption key, or perform an encryption or tokenization operation.

Further, the present invention is platform agnostic and data protection solution agnostic and eliminates the need for code changes on any existing software module and minimizes deployment/redeployment efforts.

BRIEF DESCRIPTION OF DRAWINGS

The present invention will be more clearly understood from the following description of embodiments thereof, given by way of example only, with reference to the accompanying FIG. 1 which is a flow diagram illustrating a method as per a preferred embodiment of the present invention.

DETAILED DESCRIPTION OF THE INVENTION

The present invention relates to a system and a computer implemented method for enabling application level data protection while not requiring application code changes, thereby keeping data persistently protected while at rest, in transit, and even when in use in certain cases, based on the chosen data protection method. The present invention allows for applying application level data protection by encapsulating and abstracting policies and operations for key management, crypto functions, secrets management, authentication, and authorization, etc., from the application code.

Referring to FIG. 1, the method disclosed in the present invention, comprises the first step of pre-defining a plurality of data protection policies for intercepting and securing application level data stored in a plurality of software modules 101. The plurality of data protection policies are defined by stipulating rules for determining the application layer data fields required to be intercepted and secured, and the manner in which the said application layer data fields are required to be secured. The said plurality of data protection policies are stored in a programmable memory means and are updated as and when required 102. In a preferred embodiment of the present invention, the plurality of a data protection policies are defined in a centralized policy engine.

Application level data protection is completely handled and abstracted by a local parameter deployed in each software module/application. In a preferred embodiment of the present invention, a first local parameter is deployed in the application layer of a first software module 103, and a second local parameter is deployed in the application layer of a second software module 104. The first local parameter is configured to access the said plurality of data protection policies 105 and to selectively filter, validate, intercept, and encrypt the application level data stored in the first software module based on the said plurality of data protection policies. In an embodiment of the present invention, the plurality of data protection policies is defined in a centralized policy engine and is fetched into the first local parameter and stored therein, until the said plurality of data protection policies are required to be refreshed or updated.

Based on the said plurality of data protection policies, the application level data is encrypted before it transits from the application layer of the first software module 106.

In an embodiment of the present invention, the first local parameter, invokes pre-defined interception policies from the plurality of data protection policies, and stores it to an internal policy file manager where the interception configuration is stored in a serialized java object format. The said interception policies further comprise the data field IDs, data field object code, and the data field name to be intercepted. The intercepted data fields are intercepted and protected as per the rules defined in the plurality of data protection policies. The first local parameter thereby enables intercepting and recreating database queries made on data elements that are marked for protection in the plurality of data protection policies.

The second local parameter is configured to access the said plurality of data protection policies 107 and to selectively filter, validate, intercept, decrypt data fields in application level data received by the second software module from the first software module, based on the said plurality of data protection policies. In an embodiment of the present invention, the plurality of data protection policies is defined in a centralized policy engine and is fetched into the second local parameter and stored therein, until the said plurality of data protection policies is required to be refreshed or updated.

Further, the said intercepted encrypted fields are decrypted by the second local parameter based on the plurality of data protection policies 108. Accordingly, as and when the second software module receives the application level data from the first software module, either directly or via an Application Program Interface (API) gateway, or from a message queue or pub-subtopic, the second local parameter makes the encrypted application level data readable to the second software module.

The first local parameter and the second local parameter are further configured to continuously access updates to the plurality of data protection policies.

In an embodiment of the present invention, the first local parameter and the second local parameter, is not hardcoded with any key management functions, crypto functions, and secrets management functions. Such functions are provided as integration points which are loosely coupled to ensure provision of a plug-n-play architecture and a vendor agnostic solution. The first local parameter and the second local parameter is configured to handle connections with external solutions which provide key and secrets management through drivers for each solution. This is enabled by interfacing the first local parameter and the second local parameter with functional methods implementing AES 256 bit encryption, or FPE-FFX, etc. by coupling/integrating with any native libraries, open source, and/or commercial off the shelf solutions, such as Java cryptographic utility, OpenSSL, HashiCorp Vault, Voltage SecureData, Google Cloud DLP, etc.

In a preferred embodiment of the present invention, a system for securing data application level data is provided. The system comprises a computing device, a plurality of software modules operably coupled to the computing device, and a programmable memory means operably coupled to the computing device.

The computing device may be a personal computer, a portable device such as a tablet computer, a laptop, a smart phone, connected medical device or any operating system based connected portable device. The programmable memory means may be any internal or external device or web-based data storage mechanism adapted to store data.

The programmable memory means has a plurality of instructions stored thereon which configures the computing device to pre-define a plurality of data protection policies for intercepting and securing application level data stored in the plurality of software modules. The plurality of data protection policies comprises rules for determining the application layer data fields required to be intercepted and secured, and the manner in which the said application layer data fields are required to be secured. The computing device is further configured to store the said plurality of data protection policies in the programmable memory means, and to deploy a first local parameter in the application layer of a first software module. The first local parameter is configured by the computing device parameter to access the said plurality of data protection policies and to selectively filter, validate, intercept, and encrypt the application level data stored in the first software module before it transits from the applicated layer of the first software module.

The computing device is further configured to deploy a second local parameter in the application layer of a second software module. The second local parameter is configured by the computing device to access the said plurality of data protection policies and to selectively filter, validate, intercept, and decrypt application level data received by the second software module from the first software module, based on the said plurality of data protection policies. The second software module may receive application level data either from an API or from a message queue or a pub-subtopic.

Although the present invention has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter. It is therefore contemplated that such modifications can be made without departing from the spirit or scope of the present invention as defined.

Further, a person ordinarily skilled in the art will appreciate that the various illustrative method steps described in connection with the embodiments disclosed herein may be implemented using electronic hardware, or a combination of hardware and software. To clearly illustrate this interchangeability of hardware and a combination of hardware and software, various illustrations and steps have been described above, generally in terms of their functionality. Whether such functionality is implemented as hardware or a combination of hardware and software depends upon the design choice of a person ordinarily skilled in the art. Such skilled artisans may implement the described functionality in varying ways for each particular application, but such obvious design choices should not be interpreted as causing a departure from the scope of the present invention.

The method described in the present disclosure may be implemented using various means. For example, the system described in the present disclosure may be implemented in hardware, firmware, software, or any combination thereof. For a hardware implementation, the processing units, or processors(s) or controller(s) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, software code may be stored in the memory means and executed by a processor. The memory means may be implemented within the processor unit or external to the processor unit. As used herein the term "memory" refers to any type of volatile memory or non-volatile memory.

In the specification, the terms "comprise, comprises, comprised and comprising" or any variation thereof and the terms "include, includes, included and including" or any variation thereof are considered to be totally interchangeable and they should all be afforded the widest possible interpretation and vice versa.

I claim:

1. A computer implemented method for securing application level data, the method comprising the steps of:
   pre-defining a plurality of data protection policies for intercepting and securing application level data stored in a plurality of software modules;
   storing the plurality of data protection policies in a programmable memory means;
   deploying a first local parameter in an application layer of a first software module;
   deploying a second local parameter in an application layer of a second software module;
   configuring the first local parameter to:
      access the plurality of data protection policies;
      selectively intercept and encrypt application level data stored in the first software module based on the plurality of data protection policies, wherein one or more application layer data fields of the application level data stored in the first software module are selectively encrypted based upon the plurality of data protection policies; and
      filter and validate the application layer data stored in the first software module based on the plurality of data protection policies;
   configuring the second local parameter to:
      access the plurality of data protection policies;
      selectively intercept and decrypt the encrypted application level data received by the second software module from the first software module, based on the said plurality of data protection policies;
   wherein the application level data stored in the first software module is selectively intercepted and encrypted by the first local parameter before it transits from the application layer of the first software module.

2. The method as claimed in claim 1, further comprising the steps of:
   configuring the second local parameter to filter and validate the application layer data received by the second software module, based on the plurality of data protection policies; and
   selecting the one or more application layer data fields required to be decrypted, based on the plurality of data protection policies.

3. The computer implemented method as claimed in claim 1, further comprising the step of configuring the first local parameter and the second local parameter to continuously access updates to the plurality of data protection policies.

4. The computer implemented method as claimed in claim 1, further comprising the step of configuring the second software module to receive application level data from an application programming interface.

5. The computer implemented method as claimed in claim 1, further comprising the step of configuring the second software module to receive application level data from a message queue.

6. The computer implemented method as claimed in claim 1, further comprising the step of pre-defining the plurality of data protection policies by stipulating rules for determining the one or more application layer data fields required to be intercepted, secured, or decrypted, and the manner in which the one or more application layer data fields are required to be secured.

7. The computer implemented method as claimed in claim 1, further comprising the steps of fetching the plurality of data protection policies into the first local parameter; and storing the said plurality of data protection policies in the first local parameter.

8. The computer implemented method as claimed in claim 1, further comprising the steps of fetching the plurality of data protection policies into the second local parameter; and storing the said plurality of data protection policies in the second local parameter.

9. A system for securing application level data, the system comprising:
 a computing device;
 a programmable memory means operably coupled to the computing device, wherein the programmable memory means has a plurality instructions stored thereon which configures the computing device to perform certain acts, the acts comprising:
  pre-defining a plurality of data protection policies for intercepting and securing application level data stored in a plurality of software modules;
  storing the plurality of data protection policies in the programmable memory means;
  deploying a first local parameter in an application layer of a first software module;
  deploying a second local parameter in an application layer of a second software module;
  configuring the first local parameter to:
   access the plurality of data protection policies;
   selectively intercept and encrypt application level data stored in the first software module based on the plurality of data protection policies, wherein one or more application layer data fields of the application level data stored in the first software module are selectively encrypted based upon the plurality of data protection policies; and
   filter and validate the application layer data stored in the first software module, based on the said plurality of data protection policies; and
  configuring the second local parameter to:
   access the plurality of data protection policies;
   selectively intercept and decrypt the encrypted application level data received by the second software module from the first software module, based on the said plurality of data protection policies;
  wherein the application level data stored in the first software module is selectively intercepted and encrypted by the first local parameter before it transits from the application layer of the first software module.

10. The system as claimed in claim 9, wherein the second local parameter is further configured to:
 filter and validate the application layer data stored in the second software module, based on the said plurality of data protection policies; and
 select the one or more application layer data fields required to be decrypted, based on the said plurality of data protection policies.

11. The system as claimed in claim 9, wherein the first local parameter and the second local parameter are further configured to continuously access updates to the said plurality of data protection policies.

12. The system as claimed in claim 9, wherein the second software module is configured to receive application level data from an application programming interface.

13. The system as claimed in claim 9, wherein the second software module is configured to receive application level data from a message queue.

14. The system as claimed in claim 9, wherein the plurality of data protection policies comprises rules for determining the one or more application layer data fields required to be intercepted and secured, and the manner in which the said one or more application layer data fields are required to be secured.

* * * * *